United States Patent [19]

Vagac et al.

[11] 4,200,486
[45] Apr. 29, 1980

[54] METHOD OF AND APPARATUS FOR RECLAIMING METALS AND PLASTICS FROM SCRAP PAPER

[75] Inventors: Svetozár Vagač, Bratislava; Břetislav Procházka, Břidličná; Jiří Müeller, Litovel; Anton Kostka; Milan Cársky, both of Bratislava, all of Czechoslovakia

[73] Assignee: Vyskumny ustav papieru a celulozy, Bratislava, Czechoslovakia

[21] Appl. No.: 819,521

[22] Filed: Jul. 27, 1977

[30] Foreign Application Priority Data

Jul. 27, 1976 [CS] Czechoslovakia .................. 4920/76

[51] Int. Cl.² ............................................. D21C 5/02
[52] U.S. Cl. ......................................... 162/8; 209/3; 209/12; 162/4; 241/28
[58] Field of Search .................... 209/3, 5, 268, 17, 13; 241/4, 28; 162/4, 8

[56] References Cited

U.S. PATENT DOCUMENTS

| | | | |
|---|---|---|---|
| 2,889,242 | 6/1959 | Teichmann | 241/28 X |
| 3,736,223 | 5/1973 | Marsh | 162/4 X |
| 3,849,245 | 11/1974 | Marsh | 162/4 |
| 3,873,418 | 3/1975 | Brox | 162/190 |
| 3,925,150 | 12/1975 | Marsh | 241/28 X |
| 3,957,572 | 5/1976 | Eriksson | 162/4 |
| 4,000,031 | 12/1976 | Acohas | 209/3 X |
| 4,017,033 | 4/1977 | Tin | 162/4 |

FOREIGN PATENT DOCUMENTS

| | | | |
|---|---|---|---|
| 1008512 | 5/1967 | Fed. Rep. of Germany | 112/4 |
| 2413278 | 9/1975 | Fed. Rep. of Germany | 162/4 |

*Primary Examiner*—Robert Halper

[57] ABSTRACT

Components of pulped scrap material containing paper, metal and plastic materials are separated by subjecting the pulped material to sorting in cyclone separators, the discharge from the top part thereof being led to a screen sorter where the material is divided into two parts, one part containing in its major part paper stuff, the other part containing plastic material, the discharge from the bottom part of the cyclone separators containing metal components.

2 Claims, 1 Drawing Figure

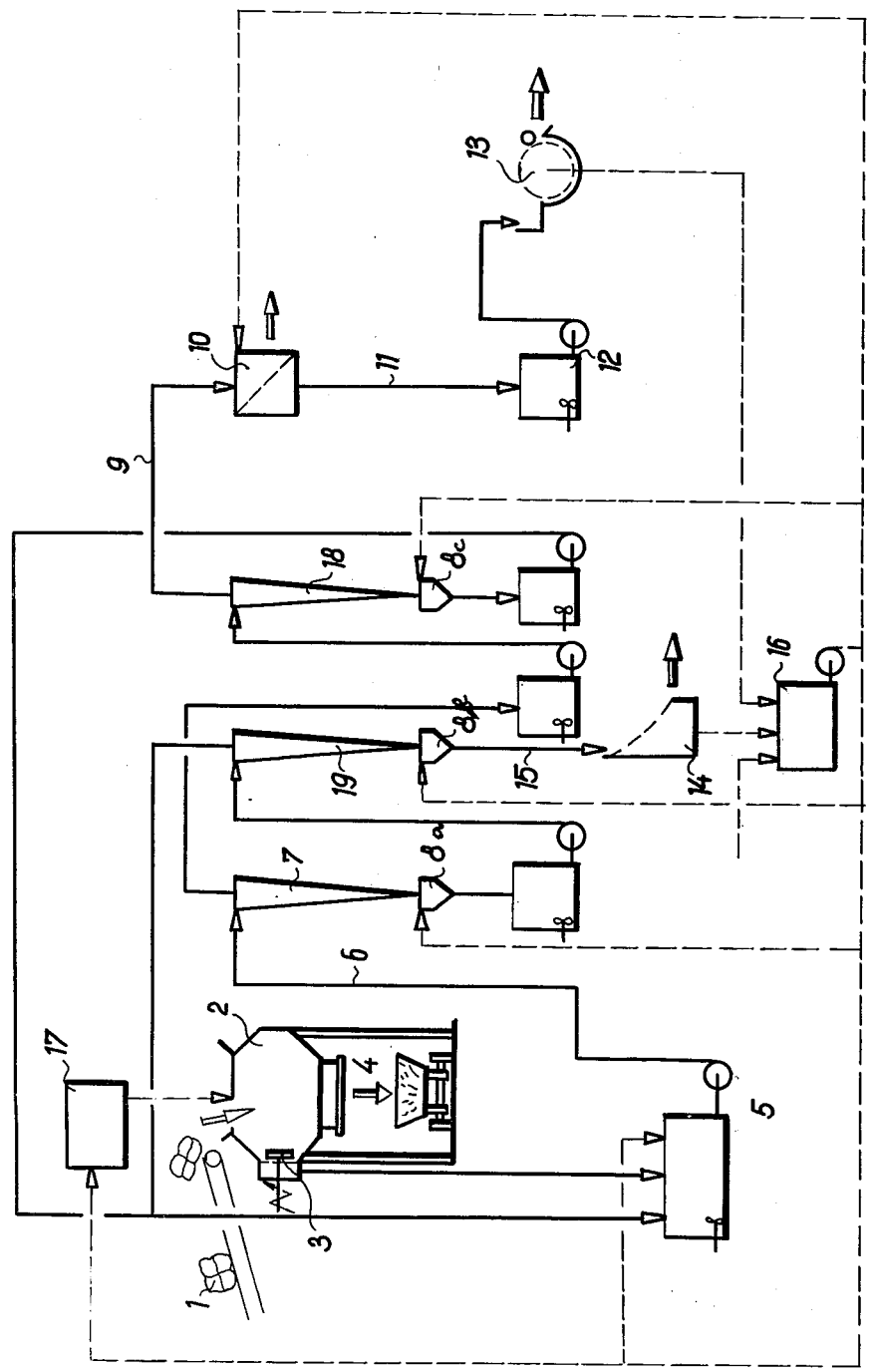

METHOD OF AND APPARATUS FOR RECLAIMING METALS AND PLASTICS FROM SCRAP PAPER

BACKGROUND OF THE INVENTION

This invention relates to a method of and to an apparatus for reclaiming components from scrap paper material as used for the packing of goods which are exposed during shipment to unfavorable weather conditions and the like. The invention insures a high grade of purity of the recovered components of the scrap.

The rapid development of automatic packaging machines in recent times has required research and manufacture of novel sheet packing materials with special properties, such as impermeability to gases and vapors, impermeability to radiations of certain wave lengths, high stress resistance, resistance to mechanical shock, good flexibility, weldability by heat, good pressing properties, resistivity to different surrounding media, and the like.

In order to meet these stringent requirements, laminated sheet packing materials have been developed, wherein each of the layers used has certain required properties. All of the layers are mutually connected to form a compact planar system by binding agents. In most cases, layers of metal, paper and plastic foils are used. The material used for individual layers is generally of high quality, unobjectionable from the point of view of health, and therefore also rather expensive.

The possibility of reclaiming individual components from the scrap of this combined material is therefore rather important from the economic point of view.

Scrap of similar combined materials also results in the course of their manufacture, for example, in case of a faulty operation of the laminating apparatus, and also in the course of their being formed, i.e., in their pressing, cutting, and when adjusting automatic packing machines.

Prior systems for the working of scrap of combined paper materials operate on a number of principles: heat treatment by burning organic components, chemical extraction of soluble components, or by defibration and flotation.

SUMMARY OF THE INVENTION

It is an object of this invention to provide a method and an apparatus wherein all components of the combined paper material comprising paper, metal and plastic materials can be reclaimed separately, each reclaimed material having a high grade of purity.

According to this invention, defibrated or pulped combined paper material is exposed to a separating in cyclone separators, whereby the bottom discharge from one of the final separating battery of cyclone separators predominantly contains metals; the material from the over-flow discharge to the last stage of cyclone separators, containing paper stuff and parts of plastic foil material, is brought to a screening separator where it is divided into two streams, whereby the material which passes through the screen of this separator predominantly contains paper fibers, and the screen overflow from the screen separator together with overflows from the tank of the defibrator predominantly contain parts of plastic foil material.

The defibration can be performed in an alkaline medium at a minimum temperature of 40° C., after separator of non-paper components a coagulation agent being added to the suspension to cause a coagulation of the dispersed material to paper fibers.

The method and apparatus for the working of combined scrap paper material according to this invention solves the problem of reclaiming the individual components in a clean condition by a simple and economical manner which entails low energy consumption. Preferred embodiments of the apparatus are characterized by low investment and operating costs, by simple attendance and maintenance, and by the obtaining of all components in pure condition.

DESCRIPTION OF THE DRAWING

The single FIGURE of the drawing is a schematic layout of an examplary embodiment of apparatus according to this invention.

DESCRIPTION OF THE PREFERRED EMBODIMENT

Scrap 1 of combined paper material is fed to a defibrator or pulper 2, where in the course of defibration in an aqueous medium a subsequent separation of individual layers and their comminution to smaller particles takes place. The aqueous suspension containing comminuted and defibrated components of layers of the combined paper material is discharged through an extraction plate 3 of the defibrator 2 into a diluting mixing tank 5.

Larger particles of foils of plastic material remain in the tank of the defibrator 2 and are removed periodically after rinsing by way of a discharge opening 4.

The diluted suspension in mixing tank 5 is pumped through a conduit 6 to a two-stage battery of cyclone separators 7, 19 and 18 each provided with an arrangement 8 for rinsing discharged material leaving the bottom of the separators. The rinsing arrangements 8a and 8b associated with separators 7, 19 respectively, insure a high grade of purity of the discharged metal component and reduces its content of fibers or plastic material to a minimum. Metal is discharged from rinsing arrangement 8b through a conduit 15 to a draining device 14 and dried prior to further use.

The suspension leaving the top of separator 7 is pumped to the top of the second stage 18 of cyclone separators. The suspension leaving the second stage of the battery of cyclone separators 18 through conduit 9 contains only paper stuff and flocs of foils from plastic material. These components are separated with high efficiency in a screening separator 10. The suspension discharged from separator 10 through conduit 11, containing paper fibers, is drained into a tank 12 from which it is pumped to a thickening device 13 from which it is passed to further treatment. The content of dispersed material in the water of the suspension passing through conduit 11 will vary according to the kind of scrap material being treated.

Alternatively, as shown in dash lines, it is possible to perform a precipitation of dispersed material to fibrous material in the tank 12 and thus to prevent an increase of its concentration in the throughgoing water collected in a tank 16, as shown, wherefrom it is pumped to the diluting tank 5, the rinsing arrangements 8 of discharged material, and via a heating device 17 to the defibrator 2.

Particles of the metal foil leave the treatment line according to this invention in the shape of balls having a diameter of 1 to 3 mm, parts of the plastic foil material leave in the shape of fine fragments having a surface dimensions of several cm², and paper fibers have in the shape of a thickened aqueous suspension.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. Method for reclaiming paper stuff, metal and plastic material from scrap of combined paper material comprising layers of paper, of metal foils, of plastic foils and a binding agent, comprising defibrating the combined paper material, in a defibrator having a tank receiving the defibrated material, exposing the defibrated material from the tank to separating by a battery of series connected cyclone separators the bottom discharge of said separators predominantly containing metals, leading material from the overflow discharge of the last of said series containing paper stuff and parts of foils of plastic material to a screening separator and dividing it into two streams, the material which passes through the screen of the screen separator predominantly containing paper fibers, and the screen overflow from the separator screen together with the overflow from the tank of the defibrator predominantly containing parts of the plastic foil material, the defibration being performed in an alkaline medium at a minimum temperature of 40° C., and after separation of the predominantly plastic foil material adding a coagulation agent to material which passes through the screen of the screen separator to cause a coagulation of the paper fibers therein.

2. Apparatus for reclaiming paper stuff, metal and plastic material from scrap of combined paper material which comprises layers of paper, metal foil, plastic foil material, and binding agents, the apparatus comprising a defibrator with an inlet for material being treated and for an aqueous medium and with an outlet for the defibrated material, a mixing tank for diluting the defibrated material, a conduit leading from the bottom of said mixing tank connected to a battery of series connected cyclone separators, with inlets, bottom outlets and top outlets, the top outlet of the first of the series being connected to the inlet of the last of said series, the bottom outlet of the first of the series being connected to an inlet of another of the series, the top outlet of said last of said series yielding a mixture of paper stuff and of particles of foils of plastic material, a screen separator with an inlet, a bottom outlet and a top outlet, the inlet of the screen separator being connected to the outlet of said last of said series; the material passing through the screen being discharged via its bottom outlet predominantly containing paper material, the remaining material leaving the screen separator via the top outlet predominantly containing particles of plastic foil material and means for rinsing said metal particles discharged from the bottom outlet of said other of said series.

* * * * *